March 7, 1933. R. B. SIMNING 1,900,590
VEHICLE
Filed July 20, 1928
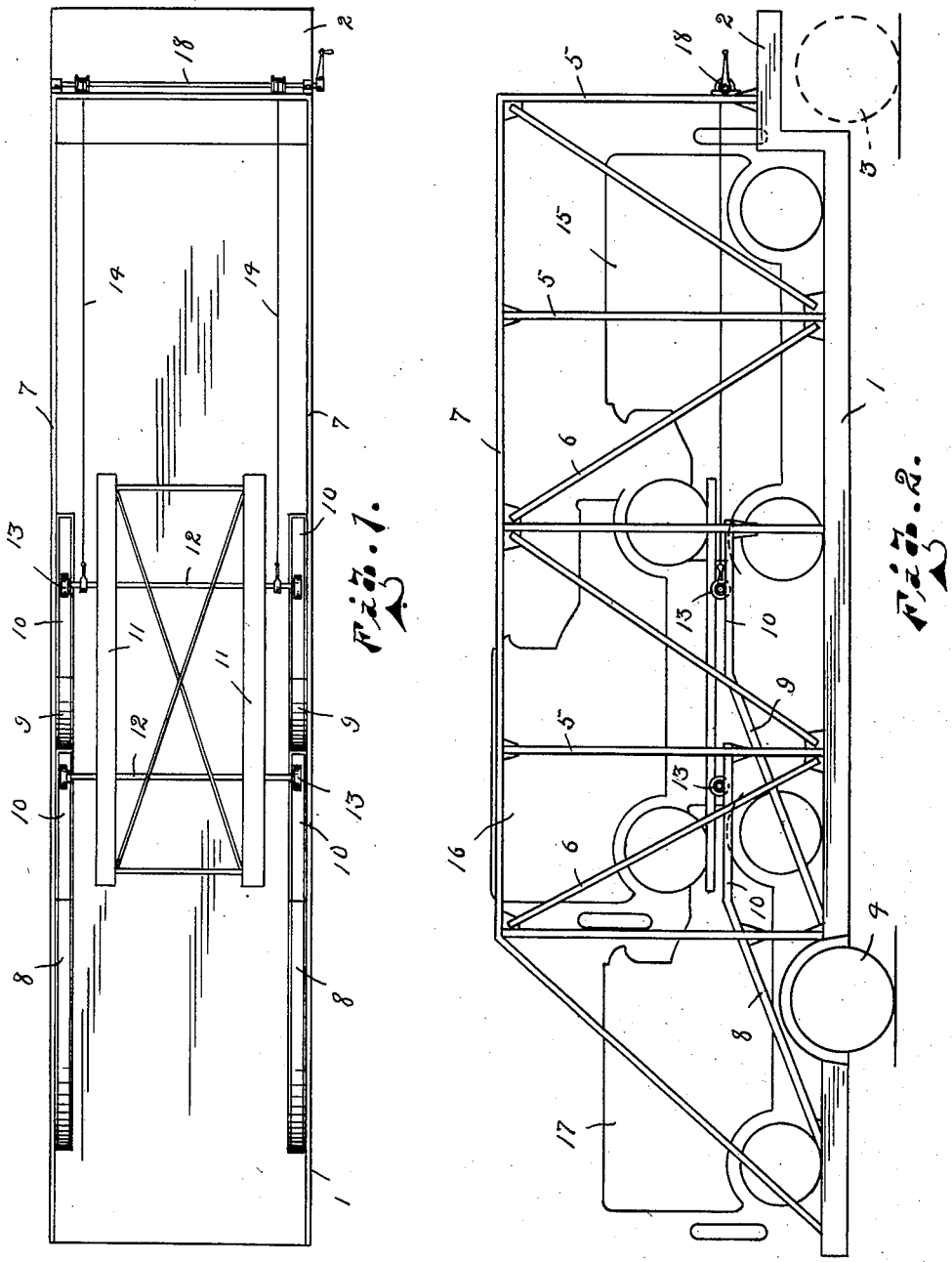

Patented Mar. 7, 1933

1,900,590

UNITED STATES PATENT OFFICE

ROY B. SIMNING, OF DULUTH, MINNESOTA, ASSIGNOR OF ONE-FOURTH TO ROLLO G. LACY, OF DULUTH, MINNESOTA

VEHICLE

Application filed July 20, 1928. Serial No. 294,240.

This invention relates to vehicles and has particular reference to a novel form of means and method for transporting automobiles.

The principal object is that of simplicity and practicability in the transporting of a plurality of automobiles.

Another object is to provide such a means and method whereby there exists the least liability of damage to the cars when being thus transported.

A further object is to provide means and method whereby the least space possible is required in such process.

Other objects and advantages of the invention will appear in the further description thereof.

Referring now to the accompanying drawing, forming part of this application, and wherein like reference characters indicate like parts:

Figure 1 is a diagrammatic plan view of one of the improved vehicles; and

Figure 2 is a side elevation of same showing automobiles nested therein.

The novel vehicle comprises preferably a stepped underslung chassis frame 1, the forward end 2 of which is elevated slightly above the axis of the front wheels as indicated at 3, while the rear wheels are indicated at 4. It is to be understood that while this vehicle is designed to be used as a trailer, it may be equally advantageously employed as what is known as a semi-trailer, in that the upwardly stepped forward portion 2 may be attached directly to the rear end of a power unit as is commonly practiced in other forms of means for the transportation of products.

Upon the chassis frame 1 is mounted preferably a metal fabricated frame structure comprising a plurality of spaced uprights 5 united as for example by the braces 6 and the fore and aft girders 7, such frame assembly existing upon either side of the chassis frame 1 and open in the rear end for admission of the automobiles. These side structures may be laterally braced by transverse girders not shown if desired, and the chassis frame covered with a deck, platform or runways for the cars as preferred.

Upon the inner edge of each frame structure just described and extending backwardly of the center of same are two pairs of inclined track sections one indicated at 8 and the other at 9, they being spaced one beneath the other and each terminating in a horizontal portion 10.

Above these track sections is mounted a carriage comprising the two spaced runways 11 mounted in any desired manner upon the spaced axles 12 of the wheels 13 which operate within the track sections 8—9, it being apparent from viewing Figure 1, that the track sections just referred to are considerably wider than the wheel gauge of the automobile, so that when raised or lowered the wheels 13 can follow their respective runway or tracks one above the other. Thus this carriage may be readily lowered upon the deck of the chassis frame and to the rear thereof when desired.

Any desired form of suitable windlass or winding shaft is indicated at 18 upon the front platform 2 of the vehicle and suitable lines 14 made to lead one upon either side to the front axle of the carriage for operating same.

Now in the loading of the automobiles the one indicated at 15 is first brought up onto the rear end of the chassis back first, it being understood that the carriage is first lowered to a level with the deck of the chassis frame so that this car may be conveniently moved thereover. Then a second car as indicated at 16 is placed upon the chassis frame front first and onto the carriage, when the latter may be drawn by the windlass bringing the car with it to the position shown in Figure 2 of the drawing where the front wheels will straddle the radiator of the first car. Then the third car, or that indicated at 17, is brought up onto the chassis deck, front first, to a position where the hind wheels of the car 16 will straddle its radiator, thus most conveniently nesting the three cars within the superstructure of the transporting vehicle.

It is to be understood that these cars may be secured in any desired manner proper for such transportation, and that the top of the side frame of the vehicle, being sufficiently high, permits of the convenient use of a canvas cover enveloping the entire load, thus providing an exceedingly convenient and practical transporting vehicle which may be used singly, as a trailer, and a semi-trailer combined, and yet be within highway requirements for such combination of vehicles.

It is evident that the car 16 may be either front or back foremost without altering the nesting advantages and that in the event of a sufficiently long vehicle being used, this form of nesting may be repeated thereby carrying a greater number of cars.

Having thus described my invention, what I claim and desire to secure by Letters Patent, is:

1. The herein described method of loading automobiles on a transport comprising first placing one automobile back foremost thereupon, then placing a second automobile above and overlapping said first automobile, and then placing a third automobile front foremost below and underlapping the second automobile.

2. A transport for vehicles comprising a structure supported upon wheels and being open at its rearmost end for the reception of the vehicles, a windlass at its front end for manipulation of the vehicles, and two elevated trackways substantially centrally of the structure for the raising, lowering, and support of one of the vehicles.

3. A transport for vehicles comprising a structure supported upon wheels, open at one end for the reception of the vehicles, means at the opposite end for manipulation of the vehicles, and means intermediate of the ends of the structure for elevating and supporting one of the vehicles.

4. A vehicle for transporting a plurality of completely assembled smaller vehicles comprising a chassis frame for support of certain of the vehicles, a fabricated superstructure upon the chassis frame, inclined track sections within the superstructure and a reciprocable vehicle supporting carriage operable upon said sections, for carrying thereupon certain of said vehicles.

5. The combination with a vehicle for transporting completely assembled automobiles, inclined track sections within said vehicle, and a reciprocal carriage for elevating and supporting thereupon certain of said vehicles, in overlapping relation to the other vehicles said carriage being operable upon said track sections.

6. A transport for vehicles comprising a chassis frame, for supporting certain of the vehicles, a superstructure upon the chassis frame, and a reciprocable carriage within the superstructure for carrying thereupon certain of said vehicles, and inclined ramps for said carriage.

7. A vehicle carrying trailer including a wheel supported frame, wheel supporting tracks supported by said frame, and of a length to guide and support the wheels of a pair of automobiles in longitudinally alined but spaced relation to each other, and additional relatively short tracks to support the wheels of a third car mounted in connection with the frame above the first named tracks centrally between the ends thereof.

8. A vehicle transporting device comprising a wheel supported frame, tracks spaced transversely to correspond to the wheel-tread spacing of the vehicles to be transported supported by said frame and extending from one end of the same and of a length sufficient to engage the front and rear wheels of such vehicle, and an upper pair of tracks supported by the frame at a height above the lower tracks less than that of the greatest height of a vehicle; said upper tracks having their inception a distance from the outer end of said lower tracks, less than the full length of a vehicle.

In testimony whereof I affix my signature.

ROY B. SIMNING.